Dec. 4, 1956   L. E. RUSSELL   2,772,692
INFLATION VALVE WITH MANUAL OPERATOR
Filed March 5, 1953

INVENTOR.
LINUS E. RUSSELL
BY
Tom Walker

United States Patent Office 2,772,692
Patented Dec. 4, 1956

2,772,692
INFLATION VALVE WITH MANUAL OPERATOR

Linus E. Russell, Springfield, Ohio, assignor to Peters & Russell, Inc., Springfield, Ohio, a corporation of Ohio Application March 5, 1953, Serial No. 340,490

12 Claims. (Cl. 137—223)

This invention relates to inflator valves of general utility, and more particularly as applied to collapsible rubber boats and the like.

The object of the invention is to improve the construction as well as the means and mode of operation of inflator valves whereby they may not only be economically manufactured, but will be more efficient and satisfactory in use, substantially automatic in operation, uniform in action, having relatively few operating parts and be unlikely to get out of repair.

An object of the invention is to provide an inflator valve adapted for installation in unit form in the article to be inflated.

Another object of the invention is to provide for positive opening and closing movements of the inflator valve.

A further object of the invention is to provide, in a device of the kind described, means for positively opening and closing the valve in response to adjustment of a readily accessible rotary adjustment member, such member serving further positively to hold the valve in adjusted position.

A still further object of the invention is to combine in an inflator valve as described, the features of a positively acting shut off valve and the features of a check valve controlled by pressure differences on opposite sides of the valve.

Still another object of the invention, in a valve as described, is to provide a single adjustment member having opposite limits of motion, in which the valve positively is held open or closed and further having intermediate positions of adjustment wherein the valve is capable of limited motion independently of the adjustment member to serve as a check valve.

A further object of the invention is to provide an inflator valve possessing the advantageous structural features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is illustrated the preferred, but obviously not necessarily the only form of embodiment of the invention, Fig. 1 is a top plan view of an inflator valve in accordance with the first illustrated form of the invention;

Like parts are indicated by similar characters of reference throughout the several views.

Figure 1:
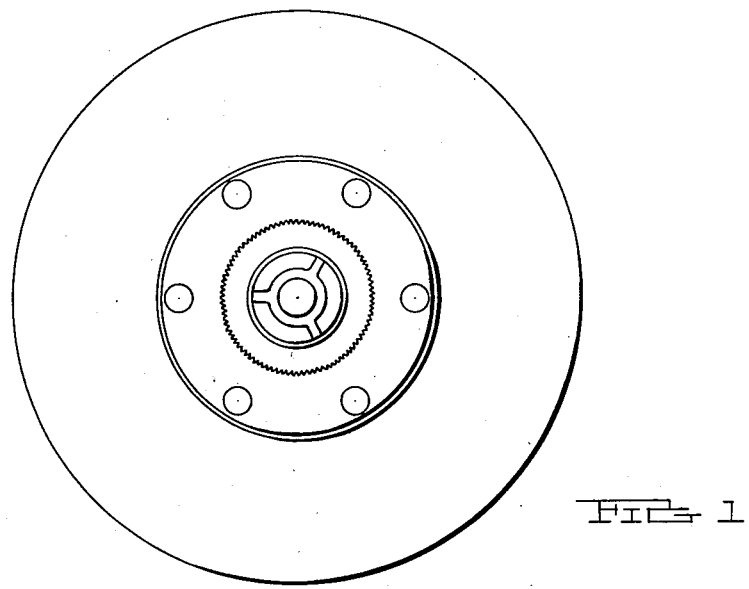
Figure 2:
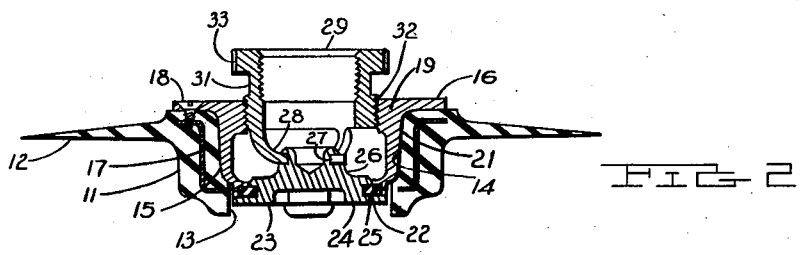
Fig. 2 is a view in longitudinal section of the valve of Fig. 1.

Referring to Figs. 1 and 2, an inflator valve in accordance with this embodiment of the invention includes a body 11 made of a relatively soft rubber or rubber-like material having the same characteristics as the material of the article to which the valve body is to be applied. The body 11 has a flange 12 of tapered thickness to facilitate its being vulcanized or otherwise bonded to the article to be inflated. The body 11 is tubular in shape, having a throughbore 13 and a counterbore 14, the latter opening through what will be considered the upper end of the body 11.

Seated in the counterbore 14 is a supplemental body or bushing 15 made of a rigid material such as metal. The bushing 15 has a flange 16 in overlying contacting relation to the upper end of the body 11. There is molded into the body 11 a metallic ring 17, the upper end of which is turned over to lie in a plane parallel to the flange 16. A detachable connection between the body 11 and the bushing 15 is achieved by screws 18 extending through the flange 16 downward into the material of the body 11 and through the ring 17 contained therein. By virtue of its mounting in the counterbore 14, and on account of the positive connection afforded by the screws 18, the bushing 15 is held against rotary motion relatively to the body 11 and may be considered a part of such body.

The bushing 15 is formed adjacent to its outer end with a wall 19 perpendicular to the longitudinal axis of the bushing, and is further formed with a skirt portion 21 in dependent relation to the wall 19. The skirt 21 terminates in a valve seat 22 facing in a direction outward with respect to the interior of the bushing 15 and inward with respect to the installed position of the valve assembly, it being understood that the lower end of the body 11, or that end more distant from the flange 12, is received in the article to be inflated when installing the valve assembly therein.

Cooperable with the valve seat 22 is a valve element 23 arranged beneath or inwardly of the valve seat in what may be described as an inwardly opening outwardly closing relation. The element 23 comprises a disc 24 mounting a deformable ring 25 adapted for direct contact with the seat 22. A stem 26 on the valve element projects axially through the seat 22 into the bushing 15. Such stem is formed with an annular groove 27 receiving fingers 28 on an adjustment member 29, the end of the stem 26 being turned over upon the fingers 28 in a manner to preclude relative axial motion between the valve element 23 and the adjustment member 29 while permitting a relative rotary motion therebetween.

The adjustment member 29 is formed with a cylindrical portion 31 which is received in an opening 32 in the wall 19. The surface of the opening 32 and the external surface of the cylindrical portion 31 are in threaded engagement in such manner that rotation of the adjustment number 29 relative to the bushing 15 results in an axial motion of the adjustment member, and, of course, of the valve element 23 to which it is connected.

The cylindrical portion 31 of the member 29 projects through the opening 32 at its both ends. The upper or outer end thereof is formed with a serrated flange 33 providing means for manually turning the adjustment member in the bushing 15. At its lower or inner end, the cylindrical portion 31 is formed with the arms or fingers 28 which are bent inward toward the longitudinal axis of the body to engage the groove 27. The fingers 28 are circumferentially spaced apart to define, in conjunction with the valve stem 26, a spider-like shape at the lower end of the member 29. Further, the member 29 is hollow and open through its upper or outer end so that fluid may flow longitudinally through the member 29, across the fingers 28, through the lower end of the bushing 15 and past the valve element 23 into the article to be inflated. Flow out of such article is by the same route, in reverse order.

In controlling the flow of fluid through the valve assembly, the adjustment member 29 is settable to alternate positions of adjustment opening and closing the element 23 with reference to the seat 22. Thus, in the position of the parts shown in Fig. 2, the flow of fluid in either direction through the valve assembly is denied by reason of the element 23 engaging the seat 22. Now, however, if the adjustment member 29 is rotated in the opening 32, in a direction to advance it axially into the bushing 15, then the valve element 23 will be moved correspondingly inward, or outward with specific regard to the seat 22, whereby to lift the disc 24 from the seat 22 and permit fluid flow in the manner before described. To close the valve, the adjustment member 29 is rotated in the opposite direction, or in a manner to retract such member in the opening 32 and thereby to return the valve disc 24 to engagement with the seat 22. The arrival of the valve element 23 in fully closed position may be signaled by the increase in resistance to turning motion of the member 29 resulting from contact of the ring 25 with the seat 22. Fully open position of the valve element 23 may be defined by abutment of the flange with the top of the wall 19.

The interior of the adjustment member 29, near the outer end thereof, is threaded to receive a hose or other form of connector extending from a pump or reservoir representing the source of fluid pressure.

Figures 3, 4, 5:
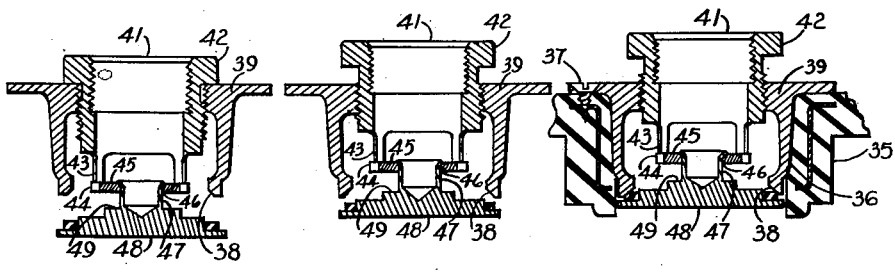
Fig. 3 is a view similar to Fig. 2, with the valve body omitted, and showing a second illustrated form of the invention, the valve being adjusted in this view to fully open position.
Fig. 4 is a view similar to Fig. 3, but showing the adjustment member set to an intermediate position wherein the valve functions as a check valve.
Fig. 5 is a view like Fig. 4, showing the valve and adjustment member set to fully closed positions.

In that form of the invention shown in Figs. 3, 4 and 5, the external plastic body member is only partly shown, indicated at 35 in Fig. 5, since it is identical to the body 11. The internal or supplemental rigid body member, here indicated at 36, similarly is identical to the bushing 15 and is similarly connected to the body 35 by means of screws 37.

Like the bushing 15, the body or bushing 36 provides a valve seat 38 at its inner end and a transverse wall 39 at its outer end. Having a threaded mounting in the wall 39 is an adjustment member 41, having a flange 42 and being in all other respects the same as the adjustment member 29 except for the construction or formation of the spider shape at the inner end thereof. In this embodiment of the invention the inner end of the adjustment member 41 comprises circumferentially spaced apart fingers 43 which are in the same plane as the body of the member 41 and which at their inner ends merge with a ring 44 having radial spokes 45 defining a central opening 46.

The opening 46 receives an elongated stem 47 of a valve element 48 which is the same as the valve element 23 except for the elongation of the stem portion thereof. At its outer end, the elongated stem 47 is turned over upon the edge of opening 46 to connect the valve element 48 to the adjustment member 41 and to define a limit of relative axial motion therebetween in one direction. A limit of relative axial motion in the opposite direction is provided by an abutment shoulder 49 at the base of the stem 47.

The construction and arrangement of the parts, in accordance with this embodiment of the invention, accordingly is such that the adjustment member 41 and the valve member 48 are capable not only of relatively rotary motion but also of limited relative axial motion. The length of the stem 47, moreover, is predetermined to provide a lesser relative extent of motion between the valve element 48 and the member 41 than is permitted the member 41 relatively to the bushing 36. Thus, when the adjustment member 41 is screwed down into the bushing 36 its full extent, as indicated in Fig. 3, the valve element 48 is lowered a distance beneath the valve seat 38 greater than the distance the valve element might be permitted to rise by virtue of its sliding mounting in the opening 46. Similarly, when the valve assembly is in the fully closed position of Fig. 5 an adequate additional relative advancing motion of the member 41 relative to the bushing 36 is permitted to compensate for the lost motion connection represented by the sliding mounting of the stem 47 in the opening 46.

In moving from the position of Fig. 3 to Fig. 5, and back again, the valve assembly of this embodiment of the invention functions in the manner of the valve of Figs. 1 and 2, that is, as a positively acting shut-off valve. This second embodiment of the invention, however, is capable of functioning also as a check valve. Thus, if the adjustment member 41 is set and allowed to remain in an intermediate position of adjustment, as shown in Fig. 4, the sliding connection between the valve element 48 and the member 41 becomes a means enabling opening and closing movements of the valve element independently of the member 41, under the control of fluid pressure.

In the intermediate position shown in Fig. 4, the valve element tends to occupy an open position but is spaced from the seat 38 a distance less than the length of the lost motion connection in the valve mounting. Hence an internal pressure (in the article in which the valve is installed) greater than the external pressure will force the valve element outward on to the seat 38, thereby closing the valve independently of the adjustment member. Similarly, the introduction of an air hose or the like into the member 41, applying relatively high pressure to the inner face of the valve element 48, will serve to open the valve independently of the member 41. The member 41, under this mode of operation, may be used merely as an overriding open and closed control whenever it may be desirable to hold the valve open or closed irrespective of pressure differences.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An inflator or like valve, including a cylindrical bushing presenting at its one end a valve seat and in inwardly spaced relation to said valve seat internal screw threads, a hollow adjustment member received in said bushing with external screw threads and having one end projecting through and beyond the other end of said bushing for manual rotation, said one end of the adjustment member being internally adapted to receive an air hose or the like, the other end of said adjustment member being formed with projecting fingers, and a valve element supported by said fingers for relative rotary motion and engageable and disengageable with respect to said valve seat under control of said adjustment member.

2. An inflator or like valve according to claim 1, characterized in that said valve element is engaged by said projecting fingers for unison axial motion with said adjustment member.

3. An inflator or like valve according to claim 1, characterized in that said valve element is supported by said fingers for limited axial motion relative to said adjustment member.

4. In an inflator or like valve assembly, a combination shut off and check valve, including a cylindrical body presenting an outwardly facing valve seat at one end thereof, a hollow tubular adjustment member received in the opposite end of said body for axial adjusting movements and providing for free fluid flow through said body, an inwardly closing outwardly opening valve disc cooperatively arranged with said valve seat, and a connection between said adjustment member and said valve disc opening and closing said valve disc in extremes of axial adjustment of said adjustment member and providing for fluid pressure responsive motion of said valve disc independently of said adjustment member in intermediate positions of said member.

5. An inflator valve assembly according to claim 4, characterized in that said connection comprises telescoping portions on said adjustment member and said valve disc, and complementary abutment portions thereon limiting the telescoping movement of said member and disc to an extent less than the permitted adjustment movement of said member.

6. An inflator or like valve, including a cylindrical body made of a relatively soft plastic material, a metallic bushing mounted in said body and having a flange in overlying contacting relation to said body, means for fastening said flange to said body, a wall on said bushing projecting radially inward toward the axis thereof adjacent to one end of the bushing, said wall having an axial threaded opening therein, means defining a valve seat adjacent to the other end of said bushing also projecting radially inward toward the axis of said bushing, a valve disc beyond said valve seat and having an axially projecting stem thereon extending through said valve seat toward said wall, the exterior of said stem being cylindrical, a hollow adjustment member having a threaded mounting in said wall, said member having openings therein communicating with the interior of said bushing between said wall and said valve seat, and supporting means on said adjustment member in free movable contact with the exterior of said stem, the outer end of said stem being turned over on said means to limit relative axial motion between said adjustment member and said valve disc, said disc being freely rotatable relatively to said adjustment member.

7. An inflator or like valve according to claim 6, characterized in that said stem is relatively short in length, said supporting means being closely confined between the turned over end on said stem and the body of said valve disc in a manner substantially to preclude relative axial motion between said valve disc and said adjustment member.

8. An inflator or like valve according to claim 6, characterized in that said stem is elongated to permit substantial amounts of axial motion of said valve disc relatively to said adjustment member as well as rotary motion.

9. An inflator or like valve, including a valve body made of a relatively soft and plastic material, said body having a through opening therein, a metallic ring contained within said body in surrounding relation to said opening, a valve assembly unitarily installed in and removable from said opening, and screw means for detachably holding said valve assembly in said opening, said screw means entering the material of said body and effecting a screw threaded engagement with said ring.

10. An inflator or like valve, according to claim 9, characterized in that said valve assembly comprises a bushing having at its one end a flange overlying said body and having said screw means passed therethrough, a manipulative member having a threaded mounting in said bushing, and a valve dependent from said member and engageable with the opposite end of said bushing to close flow through said bushing, said valve being connected to said member for limited relative axial motion whereby in extremes of adjustment of said manipulative member said valve is opened and closed and in an intermediate position of adjustment thereof said valve may function as a check valve.

11. An inflator or like valve, including a cylindrical body made of a relatively soft plastic material and adapted for permanent installation in a wall of similar material, a metallic bushing mounted in said body and having a flange in overlying contacting relation to said body, removable means for fastening said flange to said body, said bushing being removable from and installed in said body at will, means defining a valve seat on said bushing in longitudinally spaced relation to said flange, a manipulative member having a threaded mounting in said bushing, and a valve supported by said member for relative rotary and longitudinal shifting motion adapted through manipulation of said manipulative member to open and close flow through said bushing, the assembly comprising said bushing, said manipulative member and said valve being installed in and removed from said body as a unit.

12. An inflator or like valve according to claim 11, characterized in that the connection between said valve and said manipulative member is such as to provide for lost motion between said member and said valve whereby in an intermediate position of adjustment of said member said valve may function as a check valve.

References Cited in the file of this patent

UNITED STATES PATENTS

| Number | Name | Date |
| --- | --- | --- |
| 461,956 | Galibert | Oct. 27, 1891 |
| 656,220 | Schrader | Aug. 21, 1900 |
| 723,606 | Jacobs | Mar. 24, 1903 |
| 862,614 | Davey | Aug. 6, 1907 |
| 1,244,881 | Menzies | Oct. 30, 1917 |
| 1,713,889 | Criswell | May 21, 1929 |
| 1,930,040 | Crowley | Oct. 10, 1933 |
| 2,275,820 | Hosking | Mar. 10, 1942 |
| 2,488,456 | Walker | Nov. 15, 1949 |